United States Patent
Morisawa et al.

(10) Patent No.: US 10,418,667 B2
(45) Date of Patent: Sep. 17, 2019

(54) NON-AQUEOUS ELECTROLYTE SECONDARY BATTERY

(71) Applicant: SANYO Electric Co., Ltd., Daito-shi, Osaka (JP)

(72) Inventors: Naoya Morisawa, Hyogo (JP); Takanobu Chiga, Osaka (JP); Takashi Takeuchi, Osaka (JP)

(73) Assignee: SANYO Electric Co., Ltd., Daito-shi (JP)

( * ) Notice: Subject to any disclaimer, the term of this patent is extended or adjusted under 35 U.S.C. 154(b) by 190 days.

(21) Appl. No.: 15/528,382

(22) PCT Filed: Sep. 24, 2015

(86) PCT No.: PCT/JP2015/004838
§ 371 (c)(1),
(2) Date: May 19, 2017

(87) PCT Pub. No.: WO2016/084288
PCT Pub. Date: Jun. 2, 2016

(65) Prior Publication Data
US 2017/0324117 A1 Nov. 9, 2017

(30) Foreign Application Priority Data
Nov. 28, 2014 (JP) ................. 2014-241638

(51) Int. Cl.
| | | |
|---|---|---|
| *H01M 10/42* | (2006.01) | |
| *H01M 10/0567* | (2010.01) | |
| *H01M 4/13* | (2010.01) | |
| *H01M 10/0569* | (2010.01) | |
| *H01M 2/34* | (2006.01) | |
| *H01M 10/0587* | (2010.01) | |
| *H01M 10/0525* | (2010.01) | |

(52) U.S. Cl.
CPC ....... *H01M 10/4235* (2013.01); *H01M 2/345* (2013.01); *H01M 4/13* (2013.01); *H01M 10/0525* (2013.01); *H01M 10/0567* (2013.01); *H01M 10/0569* (2013.01); *H01M 10/0587* (2013.01); *H01M 2200/20* (2013.01); *H01M 2300/0034* (2013.01); *H01M 2300/0037* (2013.01)

(58) Field of Classification Search
CPC ......... H01M 10/4235; H01M 10/0569; H01M 10/0567; H01M 10/0587; H01M 10/0525; H01M 4/13; H01M 2/345; H01M 2200/20; H01M 2300/0037; H01M 2300/0034
See application file for complete search history.

(56) References Cited

U.S. PATENT DOCUMENTS

| | | | |
|---|---|---|---|
| 5,427,875 A | 6/1995 | Yamamoto et al. | |
| 2005/0031963 A1 | 2/2005 | Im et al. | |
| 2010/0104950 A1* | 4/2010 | Lamanna | C07D 317/14 |
| | | | 429/332 |

FOREIGN PATENT DOCUMENTS

| | | | |
|---|---|---|---|
| JP | 4-328278 A | 11/1992 | |
| JP | 11-195429 A | 7/1999 | |
| JP | 2007-504628 A | 3/2007 | |
| JP | 2008-277106 A | 11/2008 | |
| JP | 2013-030284 | * | 2/2013 |
| JP | 2014-49287 A | 3/2014 | |

OTHER PUBLICATIONS

International Search Report dated Nov. 10, 2015, counterpart of International Application No. PCT/JP2015/004838 (1 page).

* cited by examiner

*Primary Examiner* — Laura Weiner
(74) *Attorney, Agent, or Firm* — Westerman, Hattori, Daniels & Adrian, LLP

(57) ABSTRACT

The present invention relates to a non-aqueous electrolyte secondary battery (30) which includes: a positive electrode (1); a negative electrode (2); a non-aqueous electrolyte containing a non-aqueous solvent; an outer package (5, 7, 19) receiving the positive electrode (1), the negative electrode (2), and the non-aqueous electrolyte; and a current interrupt valve (14) which interrupts a current in response to an increase in pressure inside the outer package (5, 7, 19). The positive electrode (1) contains a carbonate compound, the non-aqueous solvent contains a fluorinated cyclic carbonate and a fluorinated chain ester, and the total content of the fluorinated cyclic carbonate and the fluorinated chain ester is with respect to the total volume of the non-aqueous solvent, 50 percent by volume or more.

4 Claims, 2 Drawing Sheets

NON-AQUEOUS ELECTROLYTE SECONDARY BATTERY

TECHNICAL FIELD

The present invention relates to a technique of a non-aqueous electrolyte secondary battery.

BACKGROUND ART

In general, a non-aqueous electrolyte secondary battery is manufactured in such a way that after a positive electrode and a negative electrode are wound or laminated with at least one separator interposed therebetween to form an electrode body, this electrode body is received in an outer package together with a non-aqueous electrolyte.

As a non-aqueous solvent used for the non-aqueous electrolyte, in order to secure the safety of the battery and to suppress the degradation of performance of the battery, a non-aqueous solvent containing a fluoroethylene carbonate and a chain ester, such as dimethyl carbonate, has been known (for example, see Patent Literature 1). In addition, according to Patent Literature 1, it is believed that by a flame-retardant function of the fluoroethylene carbonate, the safety of the battery is secured, and by the chain ester, an increase in viscosity of the non-aqueous electrolyte is suppressed, so that the degradation of performance of the battery is suppressed.

Incidentally, in general, the non-aqueous electrolyte secondary battery is provided with a current interrupt device (CID) which interrupts a charge current when the pressure inside the outer package is increased to a predetermined value or more. For example, when the battery is placed in an overcharged state, although a solvent and the like of the non-aqueous electrolyte is electrolyzed to generate gases, this current interrupt device interrupts a charge path of the battery in response to this gas generation, and as a result, a further overcharge is prevented.

As a method to enable the current interrupt device described above to more rapidly function, a method in which lithium carbonate is added to the positive electrode has been known (for example, see Patent Literature 2). According to Patent Literature 2, since lithium carbonate is added in advance into the positive electrode, lithium carbonate is decomposed during overcharge, and a carbon dioxide gas is generated, so that during overcharge, the current interrupt device is able to rapidly function.

CITATION LIST

Patent Literature

Patent Literature 1: Japanese Published Unexamined Patent Application No. 2007-504628
Patent Literature 2: Japanese Published Unexamined Patent Application No. 4-328278

SUMMARY OF INVENTION

Technical Problem

However, by the non-aqueous solvent disclosed in Patent Literature 1, for example, in the case in which the battery in a charged state is stored in a high-temperature environment or in the case in which the battery in a high-temperature environment is continuously charged, the non-aqueous solvent is decomposed, and gas generation is liable to occur, so that the current interrupt device is liable to malfunction in some cases. In particular, in the case in which a carbonate compound, such as lithium carbonate, is added to the positive electrode, since a large amount of a carbon dioxide gas is generated by a reaction between decomposed substances derived from the solvent described above and lithium carbonate, it becomes difficult to enable the current interrupt device to appropriately function.

Accordingly, the present disclosure provides a non-aqueous electrolyte secondary battery which can reduce the gas generation amount at a high temperature and which enables the current interrupt device to appropriately function.

Solution to Problem

A non-aqueous electrolyte secondary battery according to one aspect of the present disclosure is a non-aqueous electrolyte secondary battery comprising: a positive electrode; a negative electrode; a non-aqueous electrolyte containing a non-aqueous solvent; an outer package receiving the positive electrode, the negative electrode, and the non-aqueous electrolyte; and a current interrupt device which interrupts a current in response to an increase in pressure inside the outer package. In this non-aqueous electrolyte secondary battery, the positive electrode contains a carbonate compound, the non-aqueous solvent contains a fluorinated cyclic carbonate and a fluorinated chain ester, and the content of the total of the fluorinated cyclic carbonate and the fluorinated chain ester is with respect to the total volume of the non-aqueous solvent, is 50 percent by volume or more.

Advantageous Effects of Invention

The non-aqueous electrolyte secondary battery according to one aspect of the present disclosure can reduce the gas generation amount at a high temperature and enables the current interrupt device to appropriately function.

DESCRIPTION OF EMBODIMENT

An embodiment of the present invention will be described. This embodiment is one example of the present invention, and the present invention is not limited to this embodiment.

Figure 1:
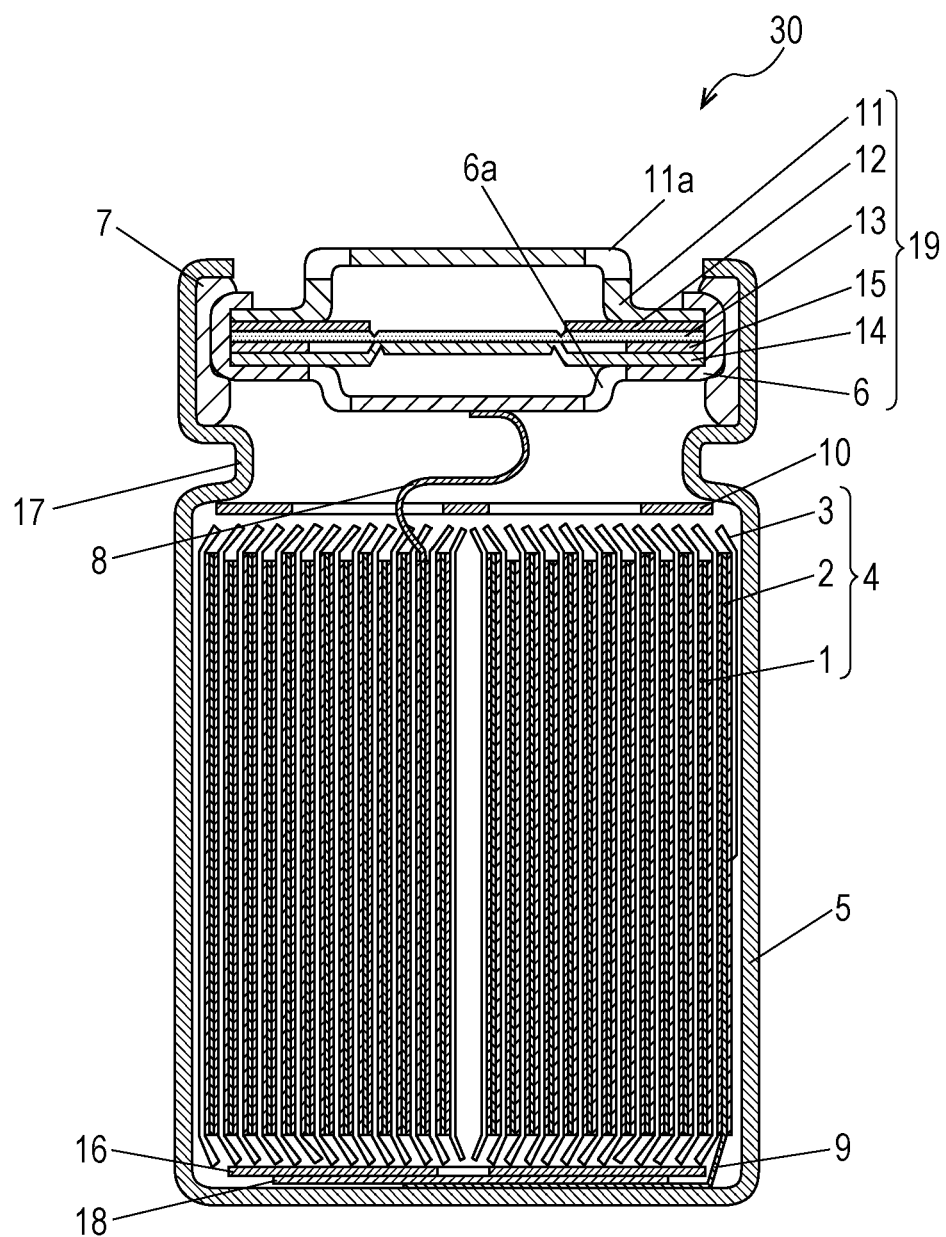
FIG. 1 is a schematic cross-sectional view of a non-aqueous electrolyte secondary battery which is one example of an embodiment of the present disclosure.

FIG. 1 is a schematic cross-sectional view showing one example of the structure of a non-aqueous electrolyte secondary battery according to this embodiment. A non-aqueous electrolyte secondary battery 30 shown in FIG. 1 includes an electrode body 4 formed by winding a positive electrode 1 and a negative electrode 2 with at least one separator 3 interposed therebetween and an outer package. The outer package of the non-aqueous electrolyte secondary battery 30 shown in FIG. 1 is formed of a battery case 5, an outer gasket 7, and a sealing plate 19. The electrode body 4 is received in the battery case 5 together with a non-aqueous electrolyte (electrolyte liquid) not shown. An open portion of the battery case 5 is sealed by the sealing plate 19 with the outer gasket 7 interposed therebetween. Accordingly, the electrode body 4 and the non-aqueous electrolyte are received inside the outer package under air tight conditions.

In the non-aqueous electrolyte secondary battery 30 shown in FIG. 1, an upper insulating plate 10 is provided at an upper side of the electrode body 4, and a lower insulating plate 16 is provided at lower side of the electrode body 4. In addition, the upper insulating plate 10 is supported by a groove portion 17 of the battery case 5, and the electrode body 4 is fixed by the upper insulating plate 10.

The sealing plate 19 shown in FIG. 1 is formed of a terminal plate 11, a thermistor plate 12, an explosion-proof valve 13, a current interrupt valve 14, a filter 6, and an inner gasket 15. The terminal plate 11, the thermistor plate 12, and the explosion-proof valve 13 are connected to each other along the circumference portions thereof. In addition, the explosion-proof valve 13 and the current interrupt valve 14 are connected to each other at the central portions thereof. Furthermore, the current interrupt valve 14 and the filter 6 are connected to each other along the circumference portions thereof. That is, the terminal plate 11 and the filter 6 are formed so as to be electrically connected to each other.

The positive electrode 1 is connected to the filter 6 with a positive electrode lead 8 provided therebetween, and the terminal plate 11 functions as an external terminal of the positive electrode 1. On the other hand, the negative electrode 2 is connected to a bottom surface of the battery case 5 with a negative electrode lead 9 interposed therebetween, and the battery case 5 functions as an external terminal of the negative electrode 2. In the battery 30 shown in FIG. 1, a metal plate 18 is disposed at an upper portion of the negative electrode lead 9. When the negative electrode lead 9 is welded to the bottom surface of the battery case 5, the voltage is applied while a welding electrode is pressed to the metal plate 18, so that the entire negative electrode lead 9 disposed at the bottom surface of the battery case 5 can be welded to the bottom surface thereof.

In the explosion-proof valve 13 and the current interrupt valve 14, annular grooves are formed at the central portions thereof, and when the grooves described above are fractured, a valve hole is formed along the grooves. For example, in the battery 30, under abnormal conditions, such as overcharge, when a gas is generated, and the pressure (inside pressure of the battery 30) inside the outer package is increased, the current interrupt valve 14 starts to function, and the groove thereof is fractured. Accordingly, the current interrupt valve 14 and the explosion-proof valve 13 are disconnected from each other, and a current path of the battery 30 is interrupted. When the pressure (inside pressure of the battery 30) inside the outer package is further increased, the explosion-proof valve 13 starts to function, and the groove thereof is fractured, so that the valve hole is formed. Accordingly, the gas generated in the battery 30 is exhausted outside of the battery through a through-hole 6a provided in the filter 6, the valve hole of the current interrupt valve 14 and the explosion-proof valve 13, and an opening portion 11a provided in the terminal plate 11. In addition, the current interrupt device interrupting a current in response to the increase in pressure inside the outer package is not limited to the current interrupt valve 14 shown in FIG. 1, and any device having the structure capable of interrupting a current in response to the increase in pressure inside the outer package may be used. In addition, the explosion-proof valve 13 is not limited to the structure shown in FIG. 1, and a valve having another structure may also be used.

In general, in a battery including a positive electrode containing a carbonate compound, when the battery is overcharged, since the carbonate compound contained in the positive electrode is decomposed, and a carbon dioxide gas is generated, the pressure inside an outer package is increased, and the current interrupt valve 14 is configured to function. However, as disclosed in the above Patent Literature 1, in the battery which uses a non-aqueous solvent containing a fluoroethylene carbonate and a chain ester, for example, when the battery in a charged state is stored in a high-temperature environment, or when the battery is continuously charged in a high-temperature environment, it is believed that the chain ester is decomposed to generate an alkoxide. In addition, since this alkoxide attacks the fluoroethylene carbonate, a hydrofluoric acid is generated, and this hydrofluoric acid reacts with the carbonate compound; hence, although the battery is not in an overcharged state, a large amount of a carbon dioxide gas is generated, and the current interrupt valve 14 may malfunction in some cases. That is, when the battery is in a high-temperature environment, although the battery is not in an overcharged state, a large amount of a carbon dioxide gas is generated, and it becomes difficult to enable the current interrupt valve 14 to appropriately function. On the other hand, in the non-aqueous electrolyte secondary battery 30 shown in FIG. 1, as described later, a non-aqueous solvent containing a fluorinated cyclic carbonate and a fluorinated chain ester is used. It is believed that even at a high temperature (such as 60° C. or more), for example, in the case in which the battery in a charged state is stored in a high-temperature environment or in the case in which the battery is continuously charged in a high-temperature environment, the fluorinated chain ester can suppress the generation of an alkoxide as compared to a non-fluorinated chain ester. Hence, a hydrofluoric acid is not likely to be generated from the fluorinated cyclic carbonate, and the generation amount of a carbon dioxide gas by the reaction between a hydrofluoric acid and a carbonate compound is reduced, so that even at a high temperature, it becomes possible to enable the current interrupt device to appropriately function. Hereinafter, individual members of the non-aqueous electrolyte secondary battery 30 will be described.

<Positive Electrode>

The positive electrode 1 is composed, for example, of a positive electrode collector formed of metal foil or the like and a positive electrode active material layer formed on the positive electrode collector. For the positive electrode collector, for example, foil of a metal, such as aluminum, stable in a potential range of the positive electrode or a film disposed on a surface layer of the metal mentioned above may be used.

The positive electrode active material layer contains a positive electrode active material and a carbonate compound and also preferably contains besides those mentioned above, an electrically conductive material and a binding material. In addition, grain surfaces of the positive electrode active material may be covered with fine grains of an inorganic compound such as an oxide including aluminum oxide ($Al_2O_3$), a phosphoric acid compound, or a boric acid compound.

The positive electrode active material is, for example, a lithium transition metal oxide containing a transition metal element, such as Co, Mn, and/or Ni. The lithium transition metal oxide is for example, $Li_xCoO_2$, $Li_xNiO_2$, $Li_xMnO_2$, $Li_xCo_{1-y}Ni_{1-y}O_2$, $Li_xCo_yM_{1-y}O_z$, $Li_xM_2O_4$, $Li_xMn_{2-y}M_yO_4$, $LiMPO_4$, or $Li_2MPO_4F$ (M is at least one type selected from Na, Mg, Sc, Y, Mn, Fe, Co, Ni, Cu, Zn, Al, Cr, Pb, Sb, and B). In this case, $0<x\leq1.2$ (x is the value right after the formation of the active material and is increased and decreased by charge and discharge), $0<y\leq0.9$, and $2.0\leq z\leq2.3$ hold. Those oxides may be used alone, or at least two types thereof may be used in combination.

As the carbonate compound, a material which is electrolyzed during overcharge of the battery to generate a carbon dioxide gas may be used without any particular restrictions, and for example, a carbonate salt, such as lithium carbonate ($Li_2CO_3$), calcium carbonate ($CaCO_3$), potassium carbonate ($K_2CO_3$), or magnesium carbonate ($MgCO_3$), may be mentioned. Among those mentioned above, lithium carbonate is preferable.

In order to generate a sufficient amount of a carbon dioxide gas so as to enable the current interrupt device to appropriately function, the content of the carbonate compound is with respect to the total mass of the positive electrode active material layer, preferably in a range of 0.2 to 10 percent by mass and more preferably in a range of 0.5 to 5 percent by mass.

The electrically conductive material is used to increase the electric conductivity of the positive electrode active material layer. As the electrically conductive material, for example, a carbon material, such as carbon black, acetylene black, ketchen black, or graphite, may be mentioned. Those materials may be used alone, or at least two types thereof may be used in combination.

The binding material is used to maintain a preferable contact state between the positive electrode active material and the electrically conductive material and also to increase a binding property of the positive electrode active material and the like to the surface of the positive electrode active material collector. As the binding material, for example, there may be mentioned a polytetrafluoroethylene (PTFE), a poly(vinylidene fluoride) (PVdF), or a modified product thereof. The binding material may be used together with a thickening agent, such as a carboxymethyl cellulose (CMC) or a poly(ethylene oxide) (PEO). Those materials may be used alone, or at least two types thereof may be used in combination.

<Negative Electrode>

The negative electrode 2 includes, for example, a negative electrode collector formed of metal foil or the like and a negative electrode active material layer formed on the negative electrode collector. For the negative electrode collector, for example, foil of a metal, such as copper, stable in a potential range of the negative electrode or a film disposed on a surface layer of a metal, such as copper, stable in a potential range of the negative electrode may be used. The negative electrode active material layer preferably contains a binding agent besides a negative electrode active material capable of occluding and releasing lithium ions. As the binding agent, as is the case of the positive electrode, although a PTFE or the like may also be used, a styrene-butadiene copolymer (SER), a modified product thereof, or the like is preferably used. The binding agent may be used together with a thickening agent, such as a CMC.

As the negative electrode active material, for example, there may be used natural graphite, artificial graphite, lithium, silicon, carbon, tin, germanium, aluminum, lead, indium, gallium, a lithium alloy, carbon and silicon each occluding lithium in advance, and an alloy and a mixture containing at least one of the materials mentioned above.

<Separator>

For the separator 3, a porous sheet having an ion permeability and an insulating property is used. As a particular example of the porous sheet, for example, a fine porous thin film, a woven cloth, or a non-woven cloth may be mentioned. As a material of the separator, a polyolefin, such as a polyethylene or a polypropylene, is preferable.

<Non-Aqueous Electrolyte>

The non-aqueous electrolyte contains a non-aqueous solvent and an electrolyte salt dissolved therein. The non-aqueous solvent contains a fluorinated cyclic carbonate and a fluorinated chain ester, and the content of the total of the fluorinated cyclic carbonate and the fluorinated chain ester is with respect to the total volume of the non-aqueous solvent, 50 percent by volume or more. Accordingly, at a high temperature, for example, in the case in which a battery in a charged state is stored in a high-temperature environment or in the case in which a battery is continuously charged in a high-temperature environment, the generation of a hydrofluoric acid caused by decomposition of the non-aqueous solvent is suppressed, and hence, the amount of gases, such as a carbon dioxide gas, generated by a reaction between the hydrofluoric acid and the carbonate compound can be reduced.

The fluorinated cyclic carbonate contained in the non-aqueous solvent is represented by the following formula (1).

[Chem. 1]

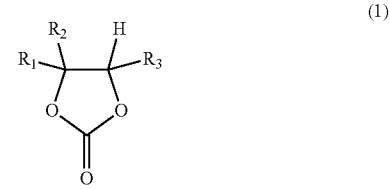

(1)

(In the formula, $R_1$ to $R_3$ each represent a group selected from a hydrogen group, a fluorine group, a fluorinated alkyl group, and an alkyl group, and at least one of a fluorine group and a fluorinated alkyl group is contained.)

As the fluorinated cyclic carbonate represented by the above formula (1), for example, there may be mentioned 4-fluoroethylene carbonate (FEC), 4,5-difluoro-1,3-dioxolane-2 one, 4,4-difluoro-1,3-dioxolane-2 one, 4-fluoro-5-methyl-1,3-dioxolane-2-one, 4-fluoro-4-methyl-1,3-dioxolane-2-one, 4-trifluoromethyl-1,3-dioxolane-2 one, or 4,5-difluoro-4,5-dimethyl-1,3-dioxolane-2-one (DFBC). Among those mentioned above, for example, since the amount of a hydrofluoric acid generated at a high temperature is reduced, FEC is preferable.

The fluorinated chain ester contained in the non-aqueous solvent is preferably at least one type selected from a fluorinated chain carbonate ester and a fluorinated chain carboxylic acid ester.

As the fluorinated chain carbonate ester, for example, there may be mentioned an ester in which at least one hydrogen atom of a lower chain carbonate ester (general formula represented by R1-OCOO—R2 (R1 and R2 each represent an alkyl group)), such as dimethyl carbonate, methyl ethyl carbonate, diethyl carbonate, methyl propyl carbonate, ethyl propyl carbonate, or methyl isopropyl carbonate, is substituted by at least one fluorine atom.

As the fluorinated chain carboxylic acid ester, for example, there may be mentioned an ester in which at least one hydrogen atom of a lower chain carboxylic acid ester (general formula represented by R1-COO—R2 (R1 and R2 each represent an alkyl group)), such as methyl acetate, ethyl acetate, propyl acetate, methyl propionate, or ethyl propionate, is substituted by at least one fluorine atom. In more particular, for example, 2,2,2-trifluoroacetatic acid ethyl ester, 3,3,3-trifluoropropionic acid methyl ester (FMP), or pentafluoropropionic acid methyl ester may be mentioned, and for example, in view of the reduction in volume of a hydrofluoric acid generated at a high temperature, FMP is preferable.

As described above, with respect to the total volume of the non-aqueous solvent, the content of the total of the fluorinated cyclic carbonate and the fluorinated chain ester is required to be set to 50 percent by volume or more and is preferably set to 80 percent by volume or more. In addition, in view of the reduction in amount of a hydrofluoric acid generated at a high temperature, the cycle characteristics, and the like, the content of the fluorinated cyclic carbonate is with respect to the total volume of the non-aqueous solvent, preferably in a range of 3 to 20 percent by volume and more preferably in a range of 5 to 15 percent by volume, and the content of the fluorinated chain ester is with respect to the total volume of the non-aqueous solvent, preferably in a range of 40 to 90 percent by volume and preferably in a range of 50 to 85 percent by volume.

The non-aqueous solvent may also contain, besides the above fluorinated cyclic carbonate and fluorinated chain ester, for example, a non-fluorinated solvent. As the non-fluorinated solvent, for example, there may be mentioned a cyclic carbonate, a chain carbonate, a carboxylic acid ester, a cyclic ether, a chain ether, a nitrile, such as acetonitrile, an amide, such as dimethylformamide, or a mixture containing at least one of those solvents mentioned above. However, the content of the non-fluorinated solvent is with respect to the total volume of the non-aqueous solvent, less than 50 percent by volume.

As an example of the above cyclic carbonate, there may be mentioned ethylene carbonate (EC), propylene carbonate (PC), butylene carbonate, or the like. As an example of the above chain carbonate, for example, there may be mentioned dimethyl carbonate, methyl ethyl carbonate (EMC), diethyl carbonate, methyl propyl carbonate, ethyl propyl carbonate, a methyl isopropyl carbonate, or the like.

As an example of the above carboxylic acid ester, there may be mentioned methyl acetate, ethyl acetate, propyl acetate, methyl propionate (MP), ethyl propionate, γ-butyrolactone, or the like.

As an example of the above cyclic ether, there may be mentioned 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, a crown ether, or the like.

As an example of the above chain ether, there may be mentioned 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, tetraethylene glycol dimethyl, or the like.

As the electrolyte salt contained in the non-aqueous electrolyte, a lithium salt is preferable. As the lithium salt, a lithium salt which has been used as a supporting salt of a related non-aqueous electrolyte secondary battery may be used. As a concrete example of the lithium salt, for example, there may be mentioned $LiPF_6$, $LiBF_4$, $LiAsF_6$, $LiClO_4$, $LiCF_3SO_3$, $LiN(FSO_2)_2$, $LiN(C_lF_{2l+1}SO_2)(C_mF_{2m+1}SO_2)$ (l and m each indicate an integer of 1 or more), $LiC(C_pF_{2p+1}SO_2)(C_qF_{2q+1}SO_2)(C_rF_{2r+1}SO_2)$ (p, q, and r each indicate an integer of 1 or more), $Li[B(C_2O_4)_2]$ [lithium-bis (oxalato)borate (LiBOB)], $Li[B(C_2O_4)F_2]$, $Li[P(C_2O_4)F_4]$, $Li[P(C_2O_4)_2F_2]$, or the like. Those lithium salts may be used alone, or at least two types thereof may be used in combination.

The mass of the non-aqueous electrolyte with respect to a battery capacity (Ah) (25° C., 1 It) of the non-aqueous electrolyte secondary battery 30 is preferably 2.2 g/Ah or more and preferably in a range of 2.5 to 2.8 g/Ah. Hereinafter, the mass of the non-aqueous electrolyte with respect to the battery capacity (Ah) of the non-aqueous electrolyte secondary battery 30 is called a liquid charge amount g/Ah of the non-aqueous electrolyte. When the liquid charge amount of the non-aqueous electrolyte is less than 2.2 g/Ah, compared to the case in which the above range is satisfied, for example, transfer of ions between the electrodes are disturbed, and as a result, the cycle characteristics may be degraded in some cases. In addition, when the value described above is excessively high, since the amount of the electrolyte liquid is increased, the cycle characteristics are improved; however, since the amount of gases generated from the electrolyte liquid is increased, the risk of CID malfunction is unfavorably increased. Since the electrolyte liquid according to the present disclosure can reduce the amount of gases generated in a non-overcharge region, compared to a general electrolyte liquid, the ratio of the liquid charge amount to the battery capacity can be increased.

The liquid charge amount of the non-aqueous electrolyte to be added to the positive electrode 1/the mass of the carbonate compound (g/g) is preferably 35 or more and more preferably in a range of 35 to 45. When the mass of the carbonate compound to be added to the positive electrode/ the liquid charge amount of the non-aqueous electrolyte is less than 35, compared to the case in which the range described above is satisfied, since the amount of the electrolyte liquid is small, the cycle characteristics may be degraded in some cases. In addition, when the value is over the range described above, the amount of gases generated from the electrolyte liquid is increased, and hence, the risk of CID malfunction is unfavorably increased. Since the electrolyte liquid according to the present disclosure can reduce the amount of gasses generated in a non-overcharge region, compared to the case of a general electrolyte liquid, the ratio of the liquid charge amount to a Li carbonate can be increased.

Although the non-aqueous electrolyte secondary battery 30 shown in FIG. 1 is a cylindrical battery including the winding type electrode body 4, the shape of the battery is not particularly limited thereto as long as the battery has a current interrupt function, and for example, a square-shape battery, a flat-shape battery, or the like may be formed.

EXAMPLES

Hereinafter, although the present invention will be further described with reference to Examples, the present invention is not limited thereto.

Example 1

[Formation of Positive Electrode]
After mixing was performed so as to form a mixture containing 95 percent by mass of $LiNi_{0.35}Co_{0.35}Mn_{0.3}O_2$, 1 percent by mass of lithium carbonate, 3 percent by mass of acetylene black, and 1 percent by mass of a poly(vinylidene fluoride), this mixture was kneaded with N-methyl-2-pyrolidone to form a slurry. Subsequently, after this slurry was applied on an aluminum foil collector functioning as a positive electrode collector and was then dried, rolling was performed, so that a positive electrode was formed.

[Formation of Negative Electrode]

After mixing was performed so as to form a mixture containing 98 percent by mass of graphite, 1 percent by mass of a carboxymethyl cellulose sodium salt, and 1 percent by mass of a styrene-butadiene copolymer, this mixture was kneaded with water to form a slurry. Subsequently, after this slurry was applied on a copper foil collector functioning as a negative electrode collector and was then dried, rolling was performed, so that a negative electrode was formed.

[Formation of Non-Aqueous Electrolyte]

After 4-fluoroethylene carbonate (FEC) and 3,3,3-trifluoropropionic acid methyl ester (FMP) were prepared at a volume ratio of 15:85, $LiPF_6$ was added to this solvent to have a concentration of 1.2 mol/l, so that a non-aqueous electrolyte was formed. To 100 parts by weight of this electrolyte liquid, 0.5 parts by weight of vinylene carbonate and 1 part by weight of propene sultone were added.

[Test Cell]

An aluminum-made positive electrode lead was welded to the positive electrode, and a nickel-made negative electrode lead was welded to the negative electrode. Subsequently, the positive electrode, the negative electrode, and separators (thickness: 30 μm) were wound, so that a winding type electrode body was obtained. After an insulating plate is disposed on each of the top and the bottom surfaces of the winding type electrode body thus obtained, and the electrode body was inserted in a cylindrical battery can having a bottom portion, the positive electrode lead was welded to a sealing body, and the negative electrode lead was welded to the battery can. Next, after the non-aqueous electrolyte was charged in the battery can, the sealing body was fixed using an insulating gasket by caulking, so that a cylindrical lithium ion secondary battery was formed. As shown in FIG. 1, in the sealing body, an explosion-proof valve and a current interrupt valve were provided. When the inside pressure of the battery reaches 1.0 MPa, this current interrupt valve functions to interrupt a current. As described above, a battery having a rated capacity of 2,300 mAh (1 It·hr) was formed. In Example 1, the liquid charge amount of the non-aqueous electrolyte was set to 2.24 g/Ah, and the liquid charge amount of the non-aqueous electrolyte/the amount of lithium carbonate was set to 36.0.

A constant current charge of the battery thus formed was performed at 0.5 It (1,150 mA) to a voltage of 4.35 V. Subsequently, after the battery was charged at a constant voltage of 4.35 V to a current of 0.02 It (46 mA), the battery was left for 20 minutes. Next, a constant current discharge was performed at 0.5 It (1,150 mA) to a voltage of 2.5 V. This charge and discharge test was performed 5 cycles, so that the battery was stabilized.

Example 2

Except that the liquid charge amount of the non-aqueous electrolyte was set to 2.54 g/Ah, and the liquid charge amount of the non-aqueous electrolyte/the amount of lithium carbonate was set to 40.8, a battery was formed in a manner similar to that of Example 1, and the battery thus formed was then stabilized in a manner similar to that of Example 1.

Example 3

Except that the liquid charge amount of the non-aqueous electrolyte was set to 2.64 g/Ah, and the liquid charge amount of the non-aqueous electrolyte/the amount of lithium carbonate was set to 42.4, a battery was formed in a manner similar to that of Example 1, and the battery thus formed was then stabilized in a manner similar to that of Example 1.

Example 4

Except that the liquid charge amount of the non-aqueous electrolyte was set to 2.77 g/Ah, and the liquid charge amount of the non-aqueous electrolyte/the amount of lithium carbonate was set to 44.5, a battery was formed in a manner similar to that of Example 1, and the battery thus formed was then stabilized in a manner similar to that of Example 1.

Example 5

Except that as the electrolyte liquid, 4-fluoroethylene carbonate (FEC), 3,3,3-trifluoropropionic acid methyl ester (FMP), and ethyl methyl carbonate (EMC) were prepared to have a volume ratio of 15:40:45, and except that the liquid charge amount of the non-aqueous electrolyte/the amount of lithium carbonate was set to 40.8, a battery was formed in a manner similar to that of Example 1, and the battery thus formed was then stabilized in a manner similar to that of Example 1.

Comparative Example 1

Except that lithium carbonate was not added to the positive electrode, and ethyl methyl carbonate (EMC) was used instead of 3,3,3-trifluoropropionic acid methyl ester (FMP), a battery was formed in a manner similar to that of Example 1, and the battery thus formed was then stabilized in a manner similar to that of Example 1.

Comparative Example 2

Except that lithium carbonate was not added to the positive electrode, ethyl methyl carbonate (EMC) was used instead of 3,3,3-trifluoropropionic acid methyl ester (FMP), the liquid charge amount of the non-aqueous electrolyte was set to 2.54 g/Ah, and the liquid charge amount of the non-aqueous electrolyte/the amount of lithium carbonate was set to 40.8, a battery was formed in a manner similar to that of Example 1, and the battery thus formed was then stabilized in a manner similar to that of Example 1.

Comparative Example 3

Except that ethyl methyl carbonate (EMC) was used instead of 3,3,3-trifluoropropionic acid methyl ester (FMP), a battery was formed in a manner similar to that of Example 1, and the battery thus formed was then stabilized in a manner similar to that of Example 1.

Comparative Example 4

Except that ethyl methyl carbonate (EMC) was used instead of 3,3,3-trifluoropropionic acid methyl ester (FMP), the liquid charge amount of the non-aqueous electrolyte was set to 2.54 g/Ah, and the liquid charge amount of the non-aqueous electrolyte/the amount of lithium carbonate was set to 40.8, a battery was formed in a manner similar to that of Example 1, and the battery thus formed was then stabilized in a manner similar to that of Example 1.

Comparative Example 5

Except that lithium carbonate was not added to the positive electrode, a battery was formed in a manner similar to that of Example 1, and the battery thus formed was then stabilized in a manner similar to that of Example 1.

Comparative Example 6

Except that lithium carbonate was not added to the positive electrode, the liquid charge amount (the amount of the non-aqueous electrolyte/the battery capacity) of the non-aqueous electrolyte was set to 2.54 g/Ah, and the liquid charge amount of the non-aqueous electrolyte/the amount of lithium carbonate was set to 40.8, a battery was formed in a manner similar to that of Example 1, and the battery thus formed was then stabilized in a manner similar to that of Example 1.

<Evaluation of Trickle Charge Time Required for Current Interrupt Valve (CID) to Function>

In a constant-temperature bath at 60° C., the battery stabilized as described above was continuously charged at a constant voltage of 4.35 V, and a time (trickle charge time) required for the current interrupt valve to function was evaluated by the following criteria. A longer trickle charge time required for the current interrupt valve to function indicates that the gas generation amount during a high-temperature storage is reduced.

A: the trickle charge time required for the current interrupt valve to function is 200 hours or more.

B: the trickle charge time required for the current interrupt valve to function is 100 to less than 200 hours.

C: the trickle charge time required for the current interrupt valve to function is less than 100 hours.

<Overcharge Test>

In an environment at 25° C., the battery stabilized as described above was charged at a constant current of 2,300 mA until the current interrupt valve functioned or the battery temperature reached 130° C., and the battery temperature was measured when the current interrupt valve functioned.

Table 1 shown the non-aqueous solvent used in each of Examples and Comparative Examples, the presence or absence of lithium carbonate, the liquid charge amount, the evaluation result, and the like.

In the battery of each of Examples 1 to 4 in which as the non-aqueous solvent, FEC/FMP (volume ratio: 15/85) was used, and lithium carbonate was added to the positive electrode, the trickle charge time required for the current interrupt valve to function was longer than that of the battery of each of Comparative Examples 3 and 4 in which FEC/EMC (volume ratio: 15/85) was used, and lithium carbonate was added to the positive electrode. That is, it can be said that the gas generation amount during a high-temperature storage was reduced. In addition, in the batteries of Examples 1 to 4, it was confirmed that while the gas generation amount during a high-temperature storage could be reduced, in an overcharged state, the current interrupt valve appropriately functioned. In addition, in the battery of each of Comparative Examples 1, 2, 5, and 6 in which no lithium carbonate was added to the positive electrode, since no gases caused by decomposition of lithium carbonate were generated in an overcharged state, even when the battery temperature reached 130° C., the current interrupt valve did not function.

In addition, from the results of Examples 1 to 4, the liquid charge amount of the non-aqueous electrolyte is preferably set to 2.2 g/Ah or more and more preferably set in a range of 2.2 to 2.8 g/Ah. In addition, the liquid charge amount of the non-aqueous electrolyte/the amount of lithium carbonate is preferably set in a range of 35 to 45.

<Formation of Model Cell>

Example 6

Lead terminals were respectively fitted to the above positive electrode (30×40 mm) and the above negative electrode (32×42 mm). Next, an electrode body was formed so that the positive electrode and the negative electrode faced each other with a separator interposed therebetween, and this electrode body and a non-aqueous electrolyte were sealed in an aluminum-made laminate outer package, the non-aqueous electrolyte being formed in such a way that after 4-fluoroethylene carbonate (FEC) and 3,3,3-trimethyl-propionic acid methyl ester (FMP) were prepared at a

TABLE 1

|  | Non-Aqueous Solvent (Volume ratio) | Lithium Carbonate | Liquid Charge Amount g/Ah | Liquid Charge Amount/ Lithium Carbonate | Evaluation of Trickle Charge Time Required for CID to Function | Overcharge Test |
| --- | --- | --- | --- | --- | --- | --- |
| Example 1 | FEC/FMP (15/85) | Addition of 1% | 2.24 | 36.0 | A | CID Functioned (120° C.) |
| Example 2 | FEC/FMP (15/85) | Addition of 1% | 2.54 | 40.8 | A | CID Functioned (115° C.) |
| Example 3 | FEC/FMP (15/85) | Addition of 1% | 2.64 | 42.4 | A | CID Functioned (111° C.) |
| Example 4 | FEC/FMP (15/85) | Addition of 1% | 2.77 | 44.5 | B | CID Functioned (105° C.) |
| Example 5 | FEC/FMP/EMC (15/40/45) | Addition of 1% | 2.54 | 40.8 | A | CID Functioned (109° C.) |
| Comparative Example 1 | FEC/EMC (15/85) | No Addition | 2.24 | 36.0 | A | At 130° C., CID Not Functioned |
| Comparative Example 2 | FEC/EMC (15/85) | No Addition | 2.54 | 40.8 | A | At 130° C., CID Not Functioned |
| Comparative Example 3 | FEC/EMC (15/85) | Addition of 1% | 2.24 | 36.0 | B | CID Functioned (115° C.) |
| Comparative Example 4 | FEC/EMC (15/85) | Addition of 1% | 2.54 | 40.8 | C | CID Functioned (105° C.) |
| Comparative Example 5 | FEC/FMP (15/85) | No Addition | 2.24 | 36.0 | A | At 130° C., CID Not Functioned |
| Comparative Example 6 | FEC/FMP (15/85) | No Addition | 2.54 | 40.8 | A | At 130° C., CID Not Functioned | volume ratio of 15:85, and LiPF$_6$ was added to the solvent described above to have a concentration of 1.2 mol/L, 0.5 parts by weight of vinylene carbonate and 1 part by weight of propene sultone were added to 100 parts by weight of this electrolyte. Accordingly, a non-aqueous electrolyte secondary battery having a design capacity of 50 mAh was formed. A constant current charge of the battery thus formed was performed at 0.5 It (25 mA) to a voltage of 4.35 V. Subsequently, after charge was performed at a constant voltage of 4.35 V to a current of 0.05 It (2.5 mA), the battery was left for 20 minutes. Next, a constant current discharge was performed at 0.5 It (25 mA) to a voltage of 2.5 V. This charge and discharge cycle was performed three times, so that the battery was stabilized.

Comparative Example 7

Except that lithium carbonate was not added to the positive electrode, and ethyl methyl carbonate (EMC) was used instead of 3,3,3-trifluoropropionic acid methyl ester (FMP), a battery was formed in a manner similar to that of Example 6, and the battery thus formed was stabilized in a manner similar to that of Example 6.

Comparative Example 8

Except that ethyl methyl carbonate (EMC) was used instead of 3,3,3-trifluoropropionic acid methyl ester (FMP), a battery was formed in a manner similar to that of Example 6, and the battery thus formed was stabilized in a manner similar to that of Example 6.

Comparative Example 9

Except that lithium carbonate was not added to the positive electrode, a battery was formed in a manner similar to that of Example 6, and the battery thus formed was stabilized in a manner similar to that of Example 5.

<Gas Analysis after Trickle Storage>

Figure 2:
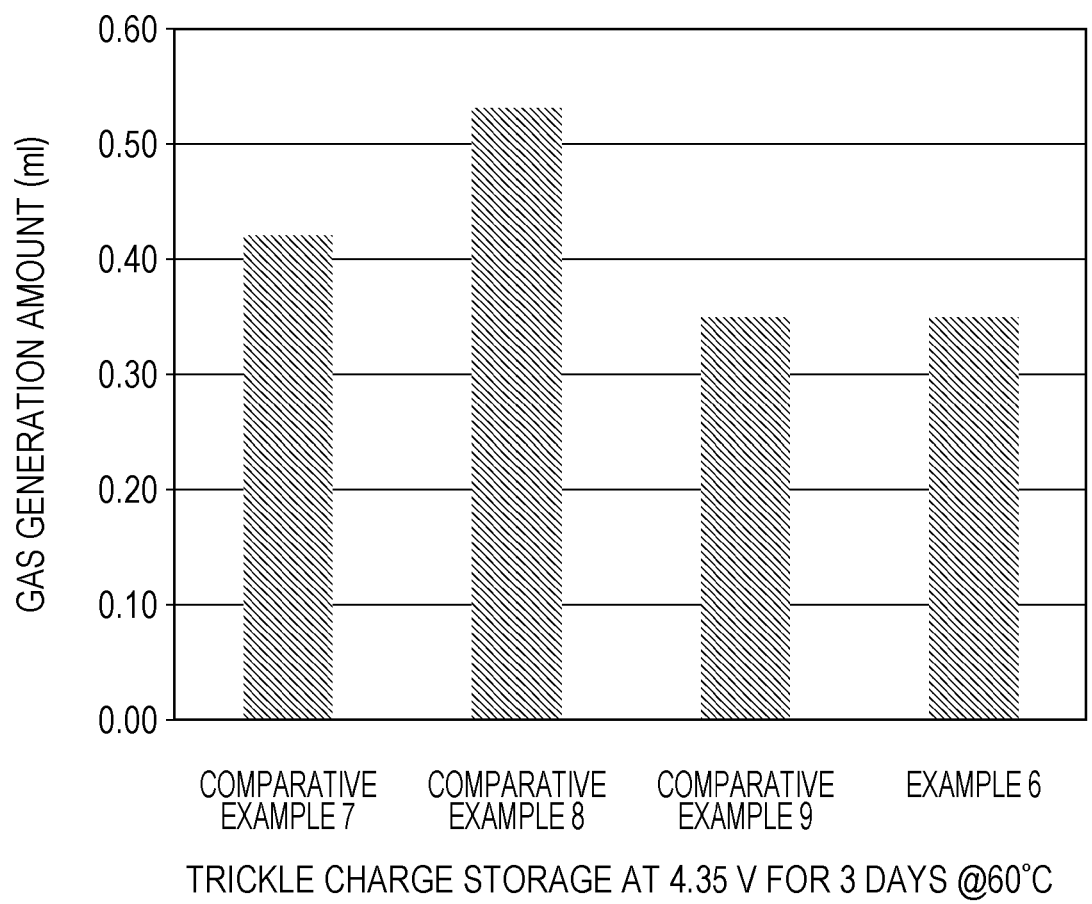
FIG. 2 is a graph showing the result of a gas generation amount generated in a battery of each of Example 6 and Comparative Examples 7 to 9.

After the discharge capacity was measured, a battery was set at a temperature of 60° C. and was then charged at 1 C (=It) (50 mA) and 4.35 V for three days. Subsequently, the quantitative analysis of gases generated in the battery was measured using a gas chromatography. The results are shown in FIG. 2. The gas generation amount in the battery of Example 6 was equivalent to that of the battery of Comparative Example 9 and was lower than that of the battery of each of Comparative Examples 7 and 8. That is, it is believed that by the use of FEC/FMP as the non-aqueous solvent, since the decomposition of the solvent during a high-temperature storage is suppressed, a reaction between lithium carbonate and solvent decomposed substances, such as a hydrofluoric acid, can also be suppressed, and as a result, the gas generation amount is reduced.

INDUSTRIAL APPLICABILITY

The present invention can be applied to a secondary battery.

REFERENCE SIGNS LIST 1 positive electrode
2 negative electrode
3 separator
5 battery case
6 filter
6a through-hole
7 outer gasket
8 positive electrode lead
9 negative electrode lead
10 upper insulating plate
11 terminal plate
11a opening portion
12 thermistor plate
13 explosion-proof valve
14 current interrupt valve
15 inner gasket
16 lower insulating plate
17 groove portion
18 metal plate
19 sealing plate
30 non-aqueous electrolyte secondary battery

The invention claimed is:

1. A non-aqueous electrolyte secondary battery comprising:
a positive electrode; a negative electrode; a non-aqueous electrolyte containing a non-aqueous solvent; an outer package receiving the positive electrode, the negative electrode, and the non-aqueous electrolyte; and a current interrupt device which interrupts a current in response to an increase in pressure inside the outer package,
wherein the positive electrode contains a carbonate compound,
the non-aqueous solvent contains a fluorinated cyclic carbonate and a fluorinated chain ester,
the total content of the fluorinated cyclic carbonate and the fluorinated chain ester is with respect to the total volume of the non-aqueous solvent, 50 percent by volume or more,
wherein the mass of the non-aqueous electrolyte with respect to a battery capacity (Ah) of the non-aqueous electrolyte secondary battery is 2.5 to 2.8 g/Ah, and
wherein the fluorinated cyclic carbonate includes 4-fluoroethylene carbonate, and the fluorinated chain ester includes 3,3,3-trifluoropropionic acid methyl ester.

2. The non-aqueous electrolyte secondary battery according to claim 1, wherein a liquid charge amount of the non-aqueous electrolyte/the amount of the carbonate compound is 35 to 45.

3. The non-aqueous electrolyte secondary battery according to claim 1, wherein the content of the fluorinated cyclic carbonate is with respect to the total volume of the non-aqueous solvent, 3 to 20 percent by volume, and the content of the fluorinated chain ester is with respect to the total volume of the non-aqueous solvent, 40 to 90 percent by volume.

4. The non-aqueous electrolyte secondary battery according to claim 1, wherein the carbonate compound includes lithium carbonate.

* * * * *